United States Patent [19]
Viola et al.

[11] Patent Number: 5,609,107
[45] Date of Patent: Mar. 11, 1997

[54] SUPPORT FOR A SELF-PROPELLED LINEAR MOTION DRIVE APPARATUS

[75] Inventors: David P. Viola, Andover; Lawrence S. Blake, Peabody, both of Mass.

[73] Assignee: Agfa Division, Bayer Corporation, Wilmington, Mass.

[21] Appl. No.: 613,550

[22] Filed: Mar. 11, 1996

Related U.S. Application Data

[63] Continuation of Ser. No. 182,602, Jan. 14, 1994, abandoned.

[51] Int. Cl.⁶ .................................................. B61C 11/00
[52] U.S. Cl. .............................................. 105/77; 105/155
[58] Field of Search ........................... 104/94; 105/29.1, 105/30, 77, 155; 384/45

[56] References Cited

U.S. PATENT DOCUMENTS

| | | | |
|---|---|---|---|
| 2,035,115 | 3/1936 | Earl | 105/77 |
| 2,198,928 | 4/1940 | Wehner | 105/77 |
| 3,922,970 | 12/1975 | Glastra | 104/94 X |
| 5,326,197 | 7/1994 | Takei | 384/45 X |
| 5,345,832 | 9/1994 | Takei | 384/45 X |
| 5,357,819 | 10/1994 | Takei | 384/45 X |

*Primary Examiner*—S. Joseph Morano
*Attorney, Agent, or Firm*—Julie A. Krolikowski; John A. Merecki

[57] ABSTRACT

The invention supports a mechanical carriage at three contact points for precise positioning on two guide rails, one guide rail having a V-grooved surface and the other having a flat surface. Two of the three contact points are recirculating ball bearings mounted against the V-grooved rail. The third contact point is on the flat rail and is also the driving contact point and comprises a drive shaft having a friction wheel thereon engaged with the flat rail to drive the mechanical carriage. The recirculating ball bearings and friction wheel are loaded against the V-grooved and flat rails, respectively, by magnets mounted on the carriage and spaced from the rails by an air gap. The air gap provides for a magnetic force between the magnets and the guide rails while permitting relative movement therebetween.

12 Claims, 3 Drawing Sheets

SUPPORT FOR A SELF-PROPELLED LINEAR MOTION DRIVE APPARATUS

This is a continuation of application Ser. No. 08/182,602, filed Jan. 14, 1994, now abandoned.

This application is related to co-pending application of Lawrence S. Blake, Arthur J. Bellemore, Ralph S. Hanseler and David P. Viola for Scanning Apparatus With Self-Propelled Linear Motion Carriage, Ser. No 08/182,488, filed on Jan. 14, 1994, and co-pending application of Lawrence S. Blake, Arthur J. Bellemore, Ralph S. Hanseler and David P. Viola for Self-Propelled Linear Motion Drive Apparatus, Ser. No. 08/182,484, filed on Jan. 14, 1994.

BACKGROUND OF THE INVENTION

The present invention relates to a support system for a carriage of a linear drive apparatus, and in particular for a self-propelled linear drive apparatus.

An example of a support system in a prior art linear drive apparatus is disclosed in U.S. Pat. No. 1,746,407, in which light is scanned onto a cylindrical surface by a beam deflector mounted on a rotating shaft inside the cylindrical surface. The cylindrical surface is moved linearly in a slide type of guide relative to the beam deflector mounted on the rotating shaft. This type of support system for the linear drive requires an operating space twice the length of the cylinder, due to the cylinder being driven linearly relative to the beam deflector.

Another support system for a carriage of a linear motion drive apparatus is disclosed in U.K. Patent No. 1,185,115, in which a carriage is moved linearly inside of a cylindrical drum by a rotating threaded rod engaging a nut assembled in the carriage. The carriage is supported by a longitudinal slot in the cylinder parallel to the axis of motion through which the carriage is coupled with the threaded rod by the nut. The threaded rod is rotated by a motor mounted outside of the cylinder.

Another embodiment shown in U.K. Patent No. 1,185,115 uses a belt connected to the carriage to pull the carriage linearly inside the length of the cylinder. The belt is driven by means of pulleys mounted externally of the cylinder at the two ends of the cylinder. The pulleys are driven by an auxiliary motor. The carriage is supported by guide rollers which are in contact with the inner surface of the cylinder and which center the axis of linear motion with the axis of the cylinder. A longitudinal guide is provided to prevent the carriage from rotating relative to the cylinder. Both of the embodiments have motors and other elements of the drive systems mounted externally of the cylinder, requiring valuable space within the imaging system.

In U.S. Pat. No. 4,816,847, two slideable members are driven along a guide and a flat rail by drive bands which are moved by friction motors. Each driven slideable member is supported in three points. The first two points of slideable contact are coaligned and engaged with the guide, and the third point of slideable contact is on the flat rail. Two C-shaped recirculating ball bearings slide along the guide while a set of opposed rollers engage the flat rail on opposing sides of the flat rail.

Drive band systems and belt and pulley systems of linear motion apparatus require numerous elements such as a lengthy drive bands and belts, tensioning mechanisms, and support components for members being driven by such systems. The number of elements and size and cost of such an apparatus is greatly reduced by incorporating a drive element into the support system, thereby providing a support for a self-propelled linear motion apparatus.

Accordingly, it is an object of the present invention to provide a linear motion drive apparatus with a support system wherein the carriage is supported at three points and wherein one of the supporting, bearing components is also a point of driving contact.

Yet, another object of the present invention is to reduce the length of one of the support rails and reduce manufacturing costs by reducing the number of components in the support system in general.

A further object of the present invention is to provide accurate positioning of the supported member with minimal slippage by loading the bearing components with permanent magnets.

SUMMARY OF THE INVENTION

According to the present invention, a support for a self-propelled linear motion drive apparatus comprises a fixed base having a carriage member relatively movable thereto along a linear motion axis on two rails mounted to the fixed base and parallel to the linear motion axis. At least one first bearing member is provided for movably supporting the member and is mounted to the member and in rolling contact with a first of the two rails and at least two second bearing members are provided for movably supporting the member being mounted to the movable member and in rolling contact with the second of the two rails such that the first and second bearing members form at least three movable support points of the member.

BRIEF DESCRIPTION OF THE DRAWINGS

The features and objects of the invention will become apparent in the following description when taken with the accompanying drawings, in which.

DETAILED DESCRIPTION OF THE INVENTION

Figure 1:
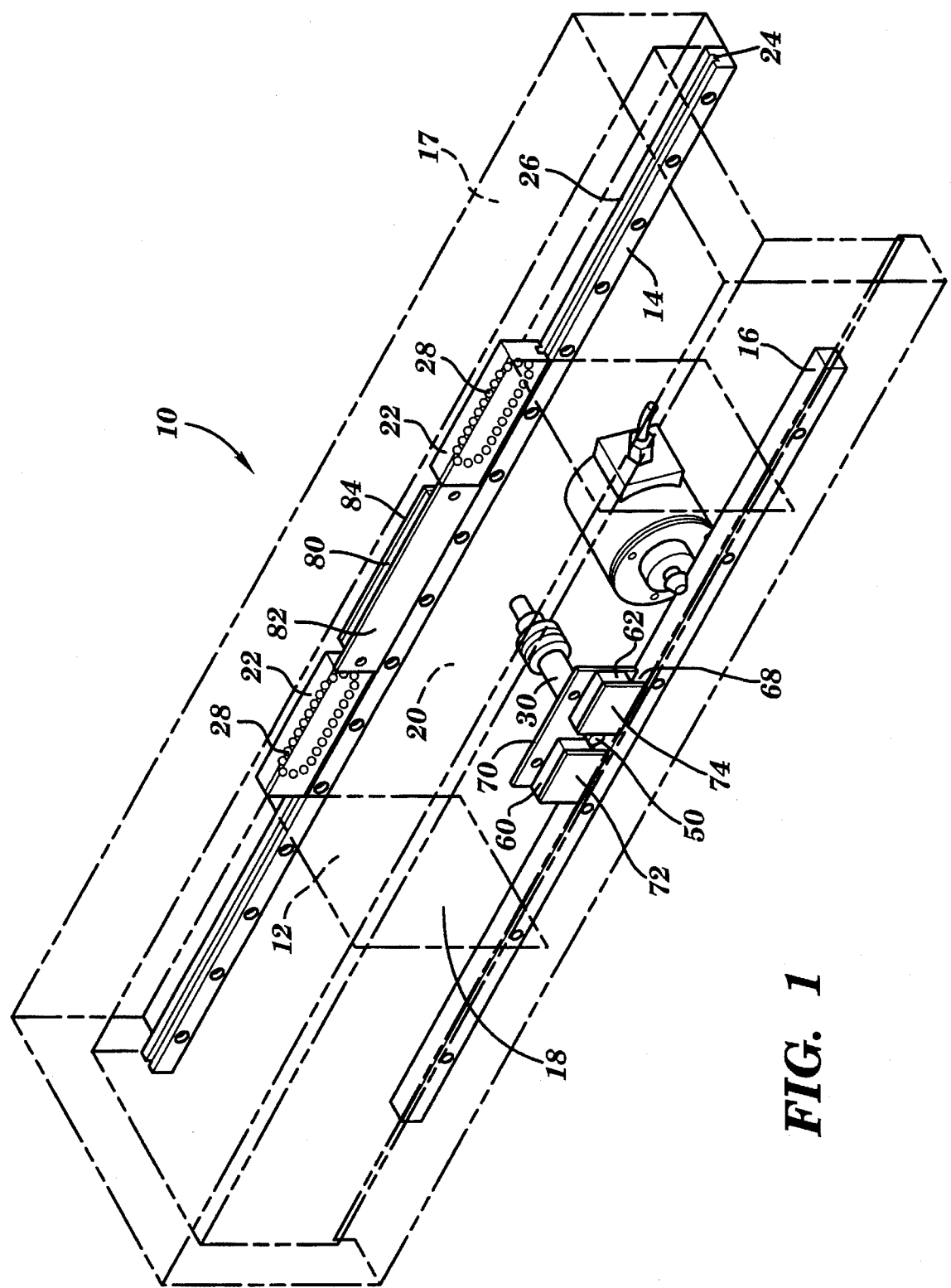
FIG. 1 is an isometric view of a support system according to the present invention used on a carriage of a self-propelled linear drive apparatus.

Referring now to FIG. 1, a linear motion drive apparatus, generally indicated by reference numeral 10, drives a carriage 12 along two spaced guide rails 14, 16 mounted within a stationary housing 17. The carriage 12, generally rectangular in form, has guide rail 16 along longitudinal side wall 18, of the stationary housing 17 and guide rail 14 along longitudinal side wall 20 to provide stabilization. The carriage 12 is supported for linear movement along linear motion axis A—A on the parallel guide rails 14, 16 by two recirculating ball. bearings 22 that allow the carriage 12 to slide with minimal friction. Rail 14 has a V-groove 24 in a top side 26 thereof to accommodate balls 28 of the recirculating ball bearings 22 rolling against the V-grooved rail 14. The beatings 22 are attached to the exterior of the side wall 20 of the carriage 12 and are spaced apart along the V-grooved rail 14 to prevent rotation of the carriage 12 relative to the guide rails 14, 16.

Figure 2:
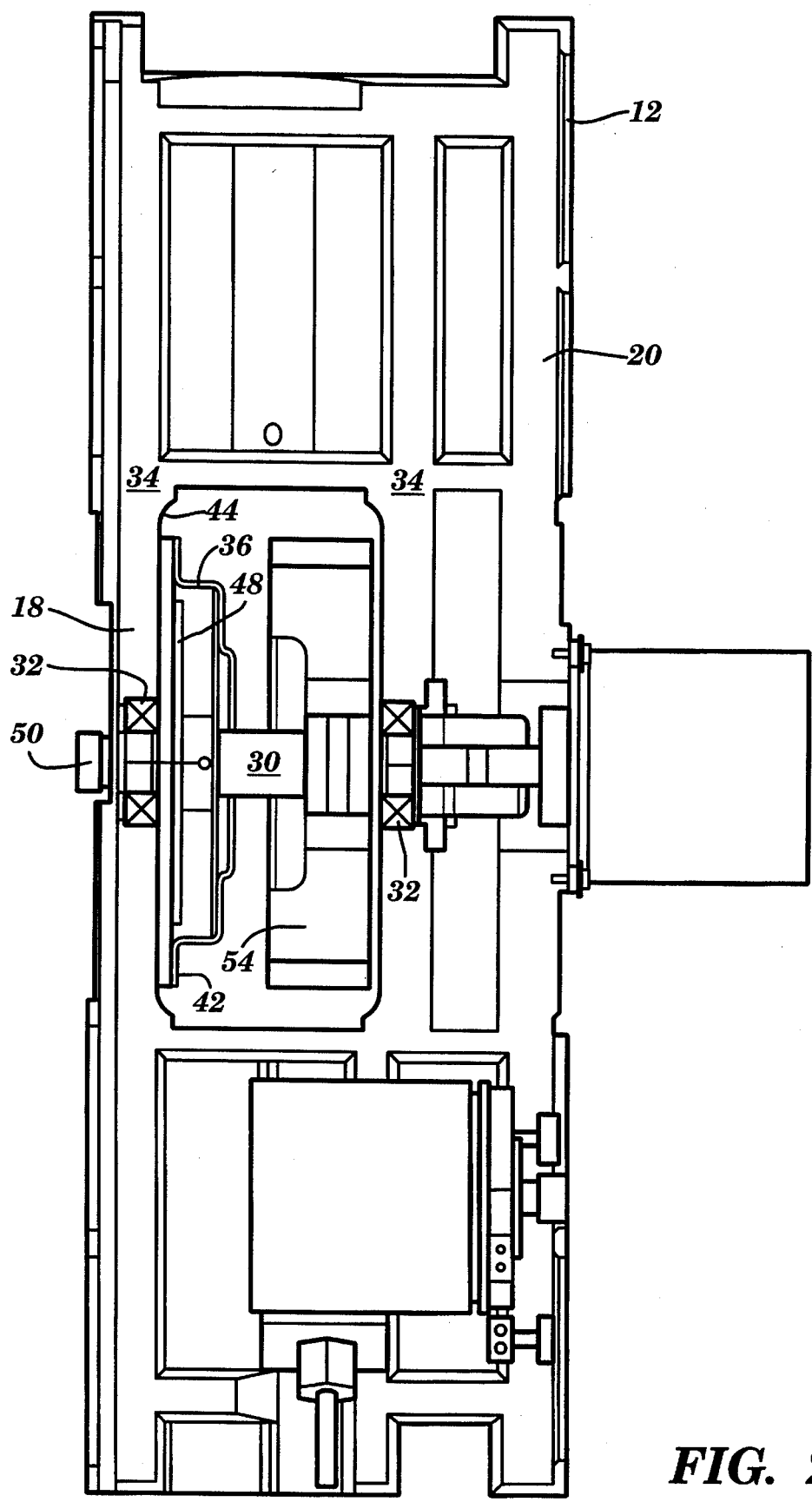
FIG. 2 is a bottom view of the carriage of FIG. 1 showing the drive system for the self-propelled carriage.

Shown in FIG. 2, a drive shaft 30 is supported for rotation by two ball bearings 32 mounted in interior walls 34 of the carriage 12. A "pancake" DC motor 36 is mounted on the carriage 12 to rotate the drive shaft 30. Near one end of the drive shaft 30, a stator motor housing 42 is fixed to an inner portion 44 of the side wall 18, and a rotor 48 is fixed to the drive shaft 30 for rotation therewith. Integral with the same end of the drive shaft 30 is a friction wheel 50 in rolling contact with the flat rail 16 to drive the carriage 12 along the rails 14, 16 upon rotation of the drive shaft 30. Near the center of the drive shaft 30, an inertia wheel 54 is fixed to the drive shaft 30 for rotation therewith to provide rotational inertia and to minimize possible motor torque ripple and transport friction variations.

Figure 3:
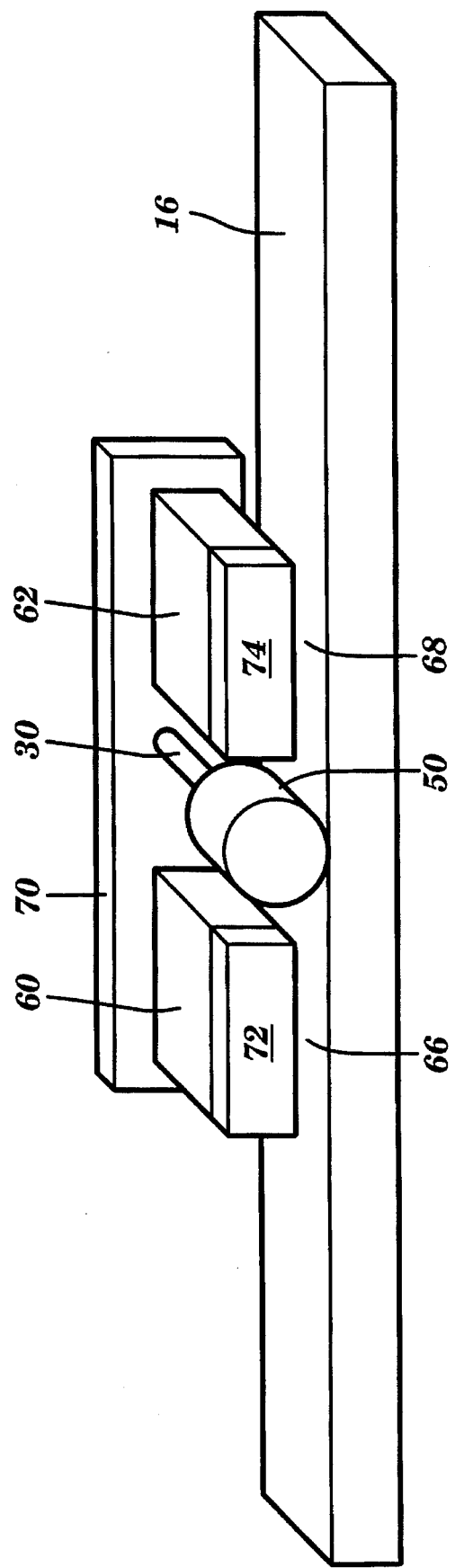
FIG. 3 is a diagrammatic view of magnetic loading of the carriage of FIG. 1 against a support rail.

Referring now to FIGS. 1 and 3, two permanent magnets 60, 62 are fixed to an outer portion of the side wall 18 of the carriage 12, one on each side of the friction wheel 50. Air gaps 66, 68 are located between each magnet 60, 62 respectively, and the flat rail 16, which can have a ferromagnetic member integral therewith or can be constructed of ferromagnetic material. A magnetic attraction between the magnets 60, 62 and the flat rail 16 urges the friction wheel 50 into frictional engagement with the flat rail 16, providing a firm contact between the friction wheel 50 and the flat rail 16, thereby to minimizing slip. Additionally, frictional contact is maintained between the friction wheel 50 and the flat rail 16 by the gravity load of the carriage 12 when mounted as in FIG. 1, however the gravity load is small compared to the magnetic force and the magnetic loading is sufficient to enable vertical mounting and linear movement along a vertical linear motion axis in addition to horizontal mounting and linear movement along a horizontal linear motion axis A—A as previously described.

It can be seen in FIGS. 1 and 3 that the two magnets 60, 62 surrounding the friction wheel 50 are fixed to a steel mounting plate 70 and the steel mounting plate 70 is in turn mounted to the carriage 12 by means of suitable fasteners (not shown). Two smaller steel plates 72, 74 are fixed to the outwardly facing sides of the two magnets 60, 62, respectively, sandwiching each of the two magnets 60, 62 between steel plates. A magnetic circuit is created when the magnets 60, 62 are positioned in the proximity of the ferromagnetic flat rail 16, and the flux lines of the magnetic field circle through the steel plates and the rail around the magnet, creating a force attracting the magnets 60, 62 and the attached carriage 12 to the flat rail 16.

Referring now to FIG. 1, on the opposite side wall 20 of the carriage 12, a large magnet 80 is interposed between the two spaced recirculating ball bearings 22. The large magnet 80 is fixed to a steel mounting plate 82 which is fastened to the exterior wall 20 of the carriage 12. The large magnet 80 is also sandwiched by a smaller steel plate 84 mounted to the outer face of the large magnet 80, like the two smaller magnets 60, 62 described above. An air gap (not shown) is located between the large magnet 80 and the V-grooved rail 14, which also has a ferromagnetic portion like the flat rail as described above. The air gap is substantially identical to the air gaps 66, 68 for the magnets 60, 62 shown and described for the flat rail 16 mounting. The large magnet 80 urges the recirculating ball bearings 22 into the V-grooved rail 14. The magnitude of the magnetic load between the magnets 60, 62 and 80 and the rails 14, 16 can be adjusted by changing the width of the air gap by adjusting the mounting position of each magnet with respect to carriage wall 18 or 20.

A primary advantage of the configuration of the recirculating ball bearings, the friction drive wheel and the permanent magnets is that the flat rail may be shortened considerably, saving on expensive manufacturing costs. Due to the recirculating ball bearings being mounted at the outer portion of the carriage and spaced apart along the V-grooved rail, the friction wheel and magnets on the other side of the carriage, which are near the center of the carriage, have a shorter linear distance to travel. Another advantage lies in the use of the friction wheel as one of the three support points for mounting the carriage, rather than three recirculating ball bearings, thereby reducing cost.

It will be appreciated by those skilled in the art that recirculating roller bearings may be used as an alternative to the recirculating ball bearings heretofore described.

The present invention allows for easy installation and removal of the carriage against the guide rails without any lengthy preloading procedure due to the use of magnets for biasing the carriage and bearing components into the guide rails. The magnets provide a repeatable preload each time the carriage is loaded onto the guide rails, whereas some prior art systems do not allow removal of the carriage from the axis of motion.

The low friction rolling contact interface of the carriage with the support and guide rails of the present invention allows smooth uniform carriage motion substantially reducing the drive torque required to move the carriage along the motion axis when compared with the lead screw and friction slide linear drives of the prior art.

While this invention has been described in terms of a preferred embodiment, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by Letters of Patent of the United States are the following:

1. A linear motion drive apparatus having a three point support movement along a linear motion axis comprising:
   (a) a first rail and a second rail distinct from one another, spaced apart, and fixed in parallel with respect to one another and to the linear motion axis;
   (b) a carriage supported for linear movement along the first and second rails;
   (c) three-point support means attached to said carriage for movably supporting the carriage along the first and second rails at a maximum of three support points in rolling contact against the first and second rails having one of said three support points contacting said first rail and two of said three support points contacting said second rail, wherein said support means comprises a drive means for driving said carriage at one of said three support points, and a bearing means at two of said three support points; and,
   (d) biasing means for urging said drive means and said bearing means into contact with the first and second rails.

2. The apparatus according to claim 1 wherein said drive means is a friction wheel in driving contact with one of said first rail and said second rail.

3. The apparatus according to claim 1 wherein said drive means is a drive wheel in driving contact with one of said first rail and said second rail.

4. The apparatus according to claim 1 further comprising motor means mounted to said carriage and mechanically coupled to said drive means for rotatably driving said drive means, thereby moving said carriage, said motor means and said drive means, relative to said first rail and said second rail.

5. The apparatus according to claim 1 wherein said biasing means are magnets mounted to said carriage such that an air gap is defined between each magnet and said first and second rails, and wherein said first and second rails are ferromagnetic.

6. The apparatus according to any of claims 1 to 5, wherein at least one of the first and second rails includes guide means for guiding said carriage along said linear motion axis.

7. The apparatus according to claim 6 wherein said guide means is a V-groove along at least one of the first and second rails and at least one said support means is urged against said V-groove.

8. The apparatus according to any of claims 1 to 5, wherein said linear motion axis is horizontal.

9. The apparatus according to any of claims 1 to 5, wherein said linear motion axis is vertical.

10. The apparatus according to any of claims 1 to 5, wherein said bearing means are recirculating ball bearings.

11. The apparatus according to any of claims 1 to 5, wherein said bearing means are recirculating roller bearings.

12. A linear motion drive apparatus having a three point support, comprising:
   (a) a first rail and a second rail fixed in parallel with respect to one another;
   (b) a carriage supported for linear movement along the first and second rails; and,
   (c) support means attached to said carriage for movably supporting the carriage along the first and second rails, said support means consisting of only three support points in rolling contact with said first and second rails wherein said support means comprises drive means for driving said carriage at one of said three support points, and bearing means at two of said three support points.

* * * * *